US009123141B2

United States Patent
Ng

(10) Patent No.: US 9,123,141 B2
(45) Date of Patent: Sep. 1, 2015

(54) GHOST ARTIFACT DETECTION AND REMOVAL IN HDR IMAGE PROCESSING USING MULTI-LEVEL MEDIAN THRESHOLD BITMAPS

(71) Applicant: KONICA MINOLTA LABORATORY U.S.A., INC., San Mateo, CA (US)

(72) Inventor: Kim Chai Ng, Foster City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 46 days.

(21) Appl. No.: 13/954,814

(22) Filed: Jul. 30, 2013

(65) Prior Publication Data

US 2015/0036024 A1    Feb. 5, 2015

(51) Int. Cl.
*G06K 9/40*    (2006.01)
*G06T 5/50*    (2006.01)
*H04N 5/265*    (2006.01)
*G06T 5/00*    (2006.01)

(52) U.S. Cl.
CPC . *G06T 5/50* (2013.01); *G06T 5/002* (2013.01); *H04N 5/265* (2013.01); *G06T 2207/20032* (2013.01); *G06T 2207/20208* (2013.01)

(58) Field of Classification Search
CPC ............. G06F 3/1454; G09G 2320/02; G09G 2320/02185; G09G 2340/0114; G09G 2340/0421; G09G 2340/06; G09G 2340/10; H04N 5/232; H04N 5/23248; H04N 5/2355
USPC ......... 382/275, 254, 260, 263, 264, 270, 272, 382/273, 274, 107; 348/239, 229.1
See application file for complete search history.

(56) References Cited

U.S. PATENT DOCUMENTS 8,525,900 B2 *  9/2013 Garten .................. 348/229.1
8,570,396 B2 * 10/2013 Rapaport ............... 348/229.1

OTHER PUBLICATIONS

Ward, "Fast, Robust Image Registration for Compositing High Dynamic Range Photographs from Handheld Exposures," Journal of Graphics Tools, vol. 8 (2), pp. 17-30, 2003.
Pece et al., "Bitmap Movement Detection: HDR for Dynamic Scenes," Proceedings of Visual Media Production (CVMP), 2010, pp. 1-8.
Srikantha et al., "Ghost Detection and Removal for High Dynamic Range Images: Recent Advances", Signal Processing: image Communications, pp. 1-23, 2012.

* cited by examiner

*Primary Examiner* — Ali Bayat
(74) *Attorney, Agent, or Firm* — Chen Yoshimura LLP

(57) ABSTRACT

A ghost detection method for high-dynamic range (HDR) image creation using multi-level median threshold bitmapping. At each of multiple levels, median threshold bitmaps (MTBs) are generated for each original low-dynamic range image. At each level, the MTBs of the multiple original images are compared to generate a ghost map for each original image which indicates the locations of ghost pixels in the original image. For each original image, the ghost maps generated at the multiple levels are combined to generate a combined ghost map. The multiple combined ghost maps can then be used in creating the HDR image, for example, by discarding pixels in an original image that are indicated by the corresponding combined ghost map as being a ghost pixel.

11 Claims, 3 Drawing Sheets

GHOST ARTIFACT DETECTION AND REMOVAL IN HDR IMAGE PROCESSING USING MULTI-LEVEL MEDIAN THRESHOLD BITMAPS

BACKGROUND OF THE INVENTION

1. Field of the Invention

This invention relates to high dynamic range (HDR) imaging, and in particular, it relates to removal of ghost artifact during HDR image creation.

2. Description of Related Art

High dynamic range (HDR) imaging is a technique used in image processing and digital photography to handle sources that have extremely large ranges of brightness (light intensity). For example, an outdoor scene in daylight may include blue sky and sunlit objects as well as objects in shadows; a night scene may include neon lights and brightly lit objects as well as poorly lit objects; an indoor scene may include bright windows as well as darker areas, etc. These scenes pose a challenge for imaging devices such as digital cameras; the dynamic range of currently available digital cameras often cannot adequately image such scenes. If the exposure level is adequate for capturing details of darker areas of the scene, the brighter areas will often be overexposed with details lost; conversely, if the exposure level is adequate for capturing details of brighter areas of the scene, the darker areas will often be underexposed with details lost.

HDR imaging techniques deal with this problem by taking multiple images of the same scene at various exposure levels, and then digitally merging the multiple images to create an HDR image that contains information from the multiple original images, so that details in both brighter and darker areas are adequately expressed in the HDR image. Methods for creating an HDR image from multiple original images are generally known. The original images are sometimes referred to as low-dynamic range (LDR) images (although it should be noted that this term does not mean that these images have low dynamic range).

During HDR image creation, ghosting artifacts can appear when object have moved, appeared or disappeared in between the shooting of the different original images. For example, during the shooting of three images, if a person walks into the scene only in the third image, then the HDR image created from the three images will have a semi-transparent figure of the person over the scene ("ghost").

Methods have been proposed to identify such ghost-inducing objects within the multiple images, so that the images can be processed to reduce or eliminate ghosting effects in the resulting HDR image. Some of these techniques are described in a survey paper, A. Srikantha and D. Sidibé, Ghost Detection and Removal for High Dynamic Range Images: Recent Advances, Signal Processing: image Communications, 27(6), pp. 650-662, 2012.

Median threshold bitmap (MTB) has been demonstrated to be effective in detecting translation shifts among the original low dynamic range (LDR) images used to generate HDR images. Translation shifts refer to the shift in camera position during the taking of the multiple LDR images and the resulting shift in the scene. An image alignment method using MTB is described in Greg Ward, "Fast, Robust Image Registration for Compositing High Dynamic Range Photographs from Handheld Exposures," Journal of Graphics Tools, Vol. 8 (2), pp. 17-30, 2003 ("Ward 2003"). The MTB method can also be used for ghost detection, as shown in F. Pece and J. Kautz, "Bitmap Movement Detection: HDR for Dynamic Scenes," in Proceedings of Visual Media Production (CVMP), 2010, pp. 1-8 ("Pece and Kautz 2010").

SUMMARY

The translation shift detection method described in the above-mentioned Ward 2003 reference uses only one-level (binary) median threshold bitmap (MTB). The ghost detection method described in Pece and Kautz 2010 also uses only one-level (binary) MTB. Using a one-level MTB is insufficient for detecting a complete number of ghost pixels; in other words, it results in many missing ghost pixels.

Accordingly, the present invention is directed to an improved method and related apparatus for ghost detection for HDR image creating using multi-level median threshold bitmaps.

An object of the present invention is to provide a ghost detection method that can accurately and robustly detect ghost pixels in a variety of scenes with large differences in luminance.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for generating a high dynamic range (HDR) image from a set of M images at different exposure levels, which includes: (a) for each image m of the set of M images, where m=1, 2, ... M, generating N level-n median threshold bitmap (MTB) for n=1, 2, ... N, where N denotes a highest level, each level-n MTB being a gray-scale image having the same size as the image m and $2^n$ gray levels, generated from the image m by mapping the pixel value of each image pixel of the image m to one of the $2^n$ gray levels, wherein the pixel value mapping maps pixel values falling within each of $2^n$ non-overlapping ranges to a gray level, wherein the $2^n$ ranges collectively span a total pixel value range of the image m, and wherein an approximately equal number of pixels of the image m is mapped to each gray level; (b) for each level n, comparing the M level-n MTBs corresponding to the M images to generate a level-n ghost map for each image m, each level-n ghost map being a binary map having a size equal to the size of the corresponding image m and having pixel values indicating whether the corresponding pixels of the corresponding image are ghost or not; (c) for each image m, combining the N level-n ghost maps using pixel-wise OR to generate a combined ghost map, where the combined ghost map has pixel values indicating whether the corresponding pixels of the image m are ghost or not; and (d) generating the HDR image using the set of M images and the corresponding combined ghost maps.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above methods.

In another method, the present invention provides a digital camera which includes: a computer usable non-transitory medium of claim described above; an imaging section for obtaining images; and a control section for controlling the imaging section to obtain the set of images having different exposure levels.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention use multi-level median threshold bitmaps (MTBs) to produce ghost maps that indicate the locations of ghost pixels in each of a set of M multiple images used for HDR image creation. The ghost maps can then be used in creating the HDR image.

The method described here is applied to each color channel (component) of the images separately. The colors of the image may be represented as RGB values, YCrCb values, etc. A gray-scale image is considered an image with a single color channel. Each color channel is referred to as an image in the description below; the set of M images, to which the ghost detection method is applied, may be a set of M red channel images, a set of M green channel images, a set of M gray-scale images, etc.

A one-level median threshold bitmap (MTB) of an image is constructed by calculating a median pixel value of the image, and then binarizing the image using the median value as a binarization threshold, resulting in a binary image. For a set of multiple images used for HDR creation, the one-level MTBs for the different images tend to be very similar despite the different exposure levels. This is because in each one-level MTB, half of the pixels are white and half are black, regardless of exposure. Thus, these MTBs can be used to detect translation shifts as described in Ward 2003, and to detect ghosts as described in Pece and Kautz 2010.

Figure 1:
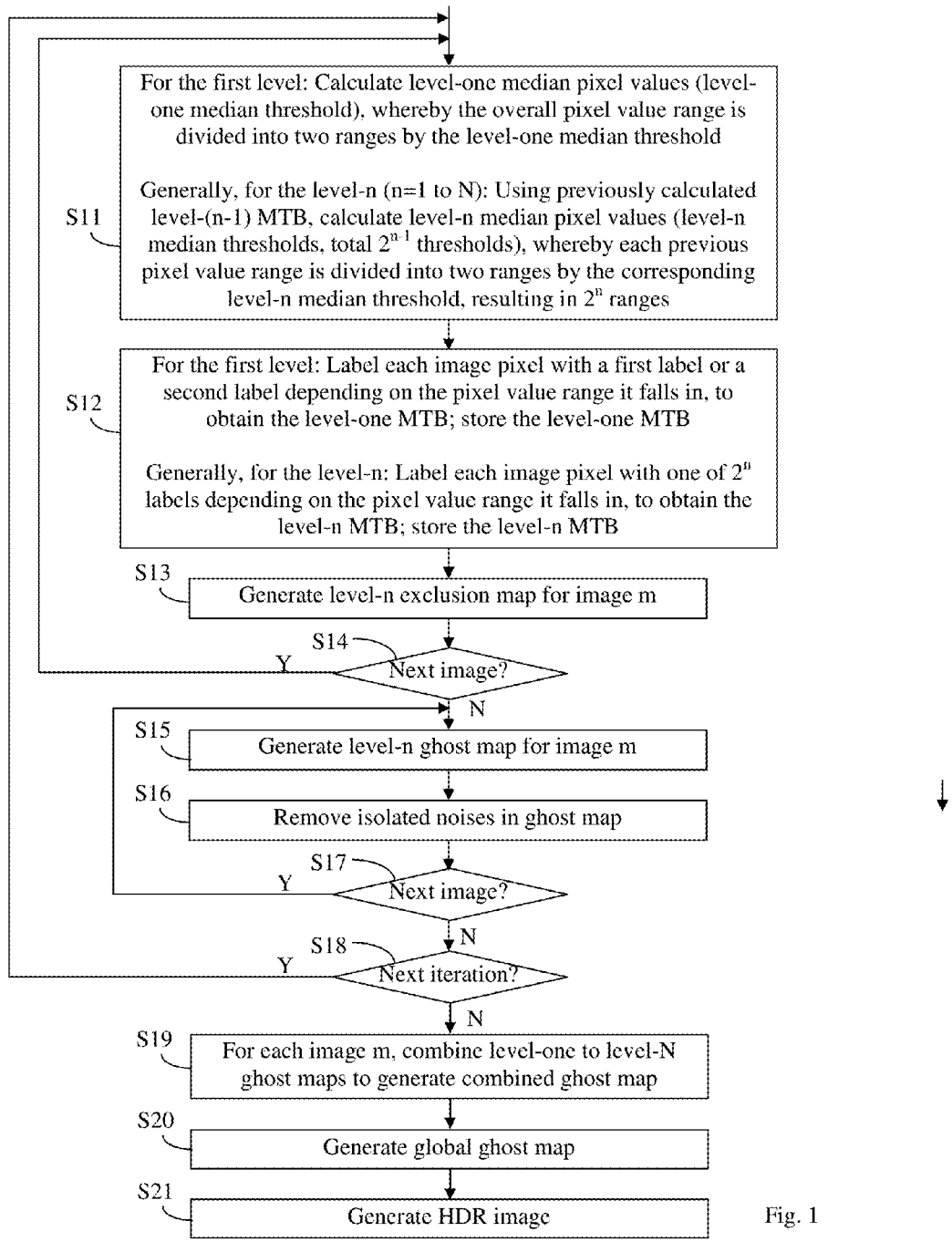
FIG. 1 schematically illustrates a method for generating an HDR image using multiple LDR images while detecting and removing ghosting artifacts according to an embodiment of the present invention.

According to embodiments of the present invention, to improve ghost detection accuracy, multi-level MTBs for each image are constructed. As shown in FIG. 1, the method of generating a multi-level MTB for an image starts with generating a level-one MTB. First, a level-one median pixel value, which is the median pixel value of all pixels of the image, is calculated (step S11). This value is referred to as the level-one median threshold. As a result, the overall pixel value range is divided into two ranges by the level-one median threshold, with an approximately equal number of image pixels falling in each range. It should be noted that the numbers of image pixels falling in the two respective ranges may not be exactly equal due to the pixel value distribution; the median threshold value is such that the numbers of image pixels falling in the two ranges are as closed to each other as possible. The term "approximately equal" as used here and in the claims should be understood in this light.

Figure 2:
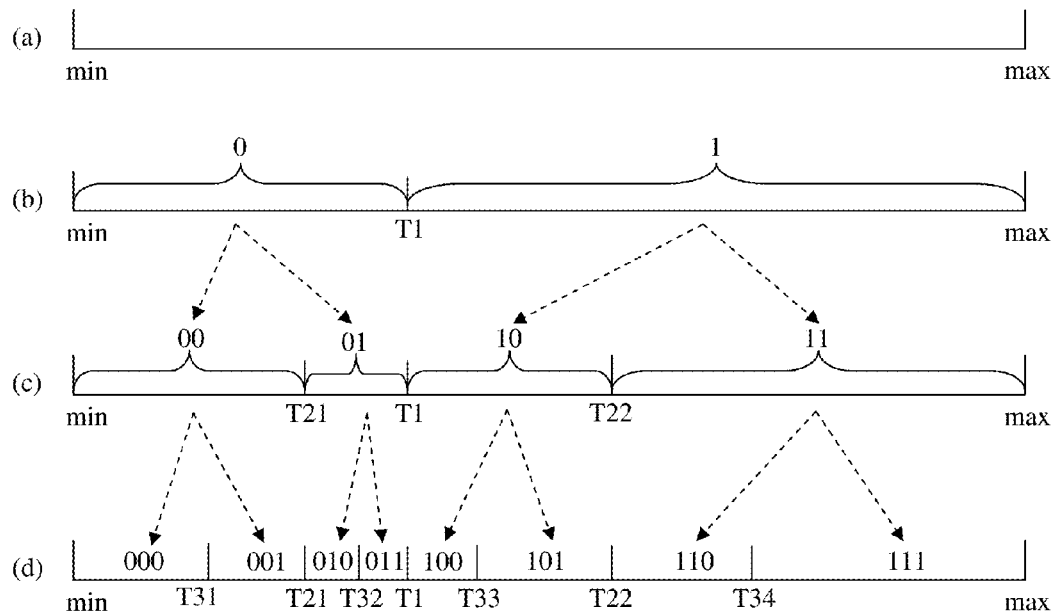
FIG. 2 schematically illustrates dividing the pixel value range into multiple ranges during multiple levels of a median threshold bitmapping process.

The result is schematically illustrated in FIG. 2(*b*), where T1 is the level-one median threshold, which divides the overall pixel value range (min to max, e.g. 0-255) into two ranges indicated by symbols "0" and "1", respectively. The two ranges may be referred to as level-one pixel value ranges. FIG. 2(*a*) shows the overall pixel value range by itself.

Each pixel of the image is then labeled with a first label or a second label (referred to as the two level-one labels) depending on which pixel value range the pixel value falls into (step S12). For example, the first and second labels may be 0 and 1, respectively, for pixels below and above, respectively, the level-one median threshold. The resulting level-one MTB is a pixel map having the same size as the image itself, where each pixel has a value which is its level-one label. The level-one MTB is stored.

Then, for all pixels labeled with the same level-one label (0 and 1, respectively), steps S11 and S12 are repeated for the next level. Two level-two median pixel values (level-two median thresholds) T21, T22 are found by repeating step S11, as shown in FIG. 2(*c*). The first level-two median threshold T21 is the median pixel value of all pixels previously label with the first level-one label 0, and the second level-two median threshold T22 is the median pixel value of all pixels previously label with the second level-one label 1. As shown in FIG. 2(*c*), each previous pixel value range is thus further divided into two ranges by a corresponding level-two median threshold, and the overall pixel value range is now divided into four ranges (level-two ranges), indicated by symbols "00", "01", "10" and "11", respectively. Pixels of the image having pixel values falling in these four ranges are labeled accordingly (referred to as the four level-two labels) (step S12). An approximately equal number of image pixels will fall in each range. The result is the level-two MTB, where each pixel has a value which is its level-two label. The level-two MTB is stored.

Then, for all pixels labeled with the same level-two label after the second iteration of steps S11 and S12, steps S11 and S12 are repeated for a third time. As a result, four level-three median pixel values (level-three median thresholds) T31 to T34 are found. Each previous pixel value range is further divided into two ranges by a corresponding level-three median threshold, and the overall pixel range is now divided into eight ranges (level-three ranges) indicated by symbols "000" to "111", as shown in FIG. 2(*d*). Pixels of the image having pixel values falling in these ranges are labeled accordingly (referred to as the eight level-three labels) (step S12). An approximately equal number of image pixels will fall in each range. The result is the level-three MTB, which is stored.

Stated more generally, for level-n, step S11 includes: using previously calculated level-(n−1) MTB, calculating the level-n median pixel values (level-n median thresholds; there are $2^{n-1}$ such thresholds), whereby each previous pixel value range is divided into two ranges by the corresponding level-n median threshold. As a result, the overall pixel value range (min to max) is divided by the level-one to level-n median thresholds into a total of $2^n$ level-n pixel value ranges (level-n ranges). An approximately equal number of image pixels will fall in each range. Step S12 includes: labeling each image pixel with one of $2^n$ labels depending on which level-n pixel value range it falls into, to obtain the level-n MTB. The level-n MTB is stored.

The level-n MTB is a multi-level thresholded image having $2^n$ gray levels, as schematically illustrated in FIGS. 2(*b*)-2(*d*). Defined more generally, a level-n MTB is a gray-scale image having $2^n$ gray levels, generated from an original image having the same size as the MTB, by mapping the pixel value of each pixel of the original image to one of the gray-levels, where the pixel value mapping maps pixel values falling within each of $2^n$ non-overlapping ranges to a gray level, where the $2^n$ ranges collectively span the total pixel value range of the original image, and where an approximately equal number of pixels of the original image is mapped to each gray level. The gray levels under this definition correspond to the labels described above.

It is noted that, when the pixel value mapping is a monotonic function, i.e. the gray level values are higher for ranges of higher pixel values, as is the case illustrated in the example of FIGS. 2(b)-2(d), the resulting MTB will visually resemble the original image. However, a monotonic function is not required for the mapping; the ghost detection method works even when the mapping is not monotonic, as long as the same mapping order is used for all images.

For each level n, a level-n exclusion map is also generated for the image (step S13). The exclusion map is a binary map having the same size as the original image, where each pixel is assigned one value indicating exclusion (e.g. 0 or a black value) if the value for that pixel in the image is within a predetermined margin v on either side of any of the level-one through level-n median threshold, and assigned another pixel value indicating non-exclusion (e.g. 1 or a white value) otherwise. For example, for the level-three shown in FIG. 2(d), pixel values within the margin [T−v, T+v] for each threshold T, including T31, T21, T32, T1, T33, T22, and T34, will cause the pixels in the exclusion map to be assigned the exclusion value 0. The purpose of the exclusion maps will be explained later.

This process (steps S11 to S13) is performed for each image m, m=1, 2, . . . M (step S14).

Then, the level-n MTBs and level-n exclusion maps are used to detect ghosts in the set of images, as shown in steps S15, S16, S19 and S20.

The ghost detection is based on the principle that the level-n MTB for all M images should be approximately the same if there are no ghosts in the images, despite the differences in exposure levels of the images. Thus, ghost detection involves comparing the same level MTBs of the set of M images to detect any differences among them.

For each level-n, a level-n ghost map for image m (m= 1, 2, . . . M) is generated by assigning to each pixel of the ghost map either a first value indicating ghost or a second value indication non-ghost (step S15). A pixel is assigned the first value indicating ghost if: (1) the corresponding pixel in the level-n MTB for image m is different from the same pixel in the level-n MTB of a number of other images (see more discussion below); and (2) the corresponding pixel in the corresponding level-n exclusion map for image m has the pixel value indicating non-exclusion (e.g. 1 or a white value). The pixel is assigned the second value indication non-ghost otherwise. The ghost map is a binary map having the same size as the original image.

In comparing the pixels of level-n MTBs across the set of M images (condition (1) above), it is expected that a majority of MTBs will not have a ghost at a given pixel location, and therefore will have the same or similar pixel values; this expectation is used to determine which image m (if any) has a ghost pixel at that pixel location. Or, the largest plurality of MTBs that have pixel values consistent with each other at a given pixel location are considered to have no ghost at that location, and the other MTBs are considered to have ghosts. If a largest plurality does not exist (for example, for M=3 images, all three MTBs are different), then it becomes a matter of definition as to which MTBs are considered to have no ghost.

The use of exclusion maps (condition (2) above) is desirable due to the abrupt transition between two sides of a median threshold in MTBs. Within the margins [T−v, T+v] around median thresholds, small changes in the pixel value in the original image can result in pixels being assigned different labels, i.e. different gray levels in the MTB. Such abrupt transition can result in the MTB comparison step (condition (1) above) to over-detect ghost pixels. By using the exclusion maps (condition (2) above), these over-detected ghost pixels can be eliminated from the ghost maps if desired. In this implementation (i.e. condition (2) in step S15 described above), the excluded pixels in the exclusion maps will be excluded from ghost maps, i.e., they will not be designated as ghosts. In alternative implementations, other treatments may be applied to the excluded pixels in the exclusion map when calculating the ghost maps; i.e., condition (2) will be different than that described above. In fact, pixels lying inside the exclusion margin zones have the potential to be ghosts; these pixels should be treated with the overall goal of balancing between a high detection rate and a low false positive rate (false positive is when non-ghost is classified as ghost).

As an another alternative, exclusion maps are not used; in other words, step S13 is omitted, and in step S15, only condition (1) is considered and condition (2) is not considered.

In one implementation, the v value is v=4. In another implementation, the v value is different for different levels; generally, the v value for higher levels should be smaller than for lower levels.

Optionally, each ghost map is processed to remove isolated noises in them (step (S16). This may be done using any suitable methods, such as morphological erosion and dilation.

Steps S15 and S16 are performed for all M images (step S17). As a result, a level-n ghost map is generated for each image m.

Steps S11 to S17 are repeated (iterated) a number of times, e.g., N=4 times (step S18). The number of iteration N may be pre-determined or dynamically determined. It is noted that the same number of iterations is carried out for each of the M images of the set.

As a result, for each image m, a set of N ghost maps, namely, the level-one through level-N ghost maps, are generated. These ghost maps are combined using a pixel-wise OR to generate a combined ghost map for image m (step S19).

The HDR image is generated (step S20) by using the M original images and the corresponding M combined ghost maps. The contribution of each pixel in each image to the HDR image will depend on the value of the ghost map. For example, a pixel of an image will not contribute to the HDR image if its corresponding pixel in the corresponding combined ghost map indicates a ghost.

Optionally, a global ghost map may be generated by combining the combined ghost maps for all M images (step S20). The global ghost map may also used if it is desired to fill in all of the detected ghost pixels (union of all ghosts from M images) using the pixel values of a selected reference image. The global ghost map may also help visualize where all detected ghosts are in the scene.

Lastly, the LDR images and their corresponding combined ghost maps are used to create HDR images (step S21). The ghost maps are used to determine whether to discard a ghost pixel during the HDR image creation process. The process of creating HDR images using LDR images, including how to discard ghost pixels using a ghost map, is generally known. Any suitable such algorithm can be used in step S21. For example, in one implementation, for each of the M images, pixels that are indicated as being ghost in the corresponding combined ghost map are omitted and their contribution to the HDR image is zero.

Prior to step S11, the LDR images can be pre-processed (not shown in FIG. 1). One pre-processing step includes blurring the image, such as by using a Gaussian blurring method.

Figure 3:
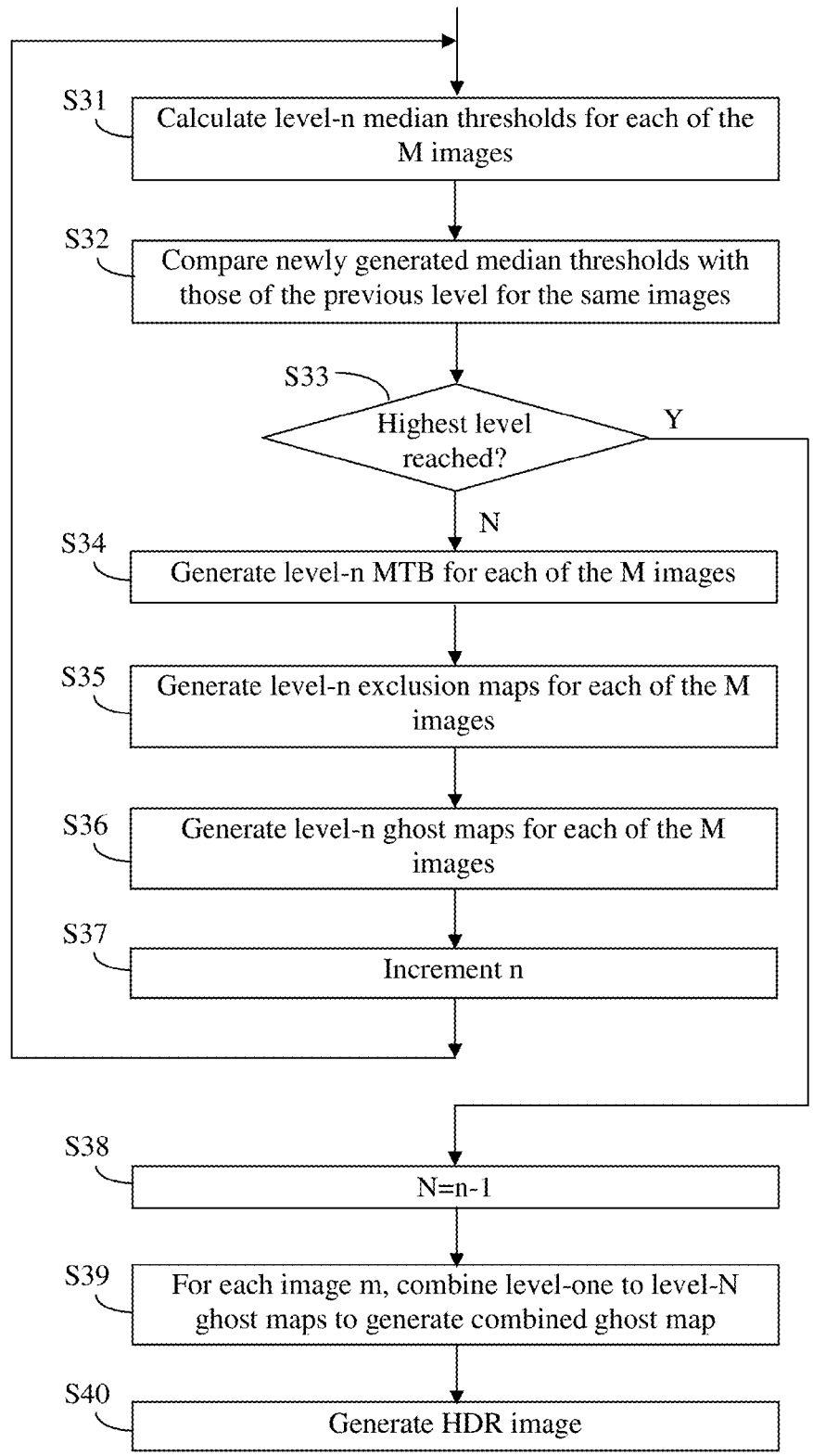
FIG. 3 schematically illustrates a method for generating an HDR image using multiple LDR images while detecting and removing ghosting artifacts according to another embodiment of the present invention.

As mentioned earlier, the number of iteration N may be pre-determined or dynamically determined. In one implementation, the number of iteration N is pre-determined to be 4. In one implementation, the number of iteration N is dynamically determined in the following way (see FIG. 3).

For each level-n, the level-n median thresholds are calculated for each of the M images (step S31). This step is similar to step S11 in FIG. 1 and its details are omitted. Then, it is determined whether any newly calculated median threshold of any of the images is the same as a previous-level median threshold for that image (step S32). This condition will be true when the pixel value ranges involved are sufficiently small and thus cannot be further divided. If this condition is true ("Y" in step S33), the remaining steps of this iteration (steps S34 to S36) will not be carried out for any images. If the condition is not true ("N" in step S33), then steps S34 to S36 are carried out at that level for each of the M images, i.e.: generating level-n MTBs (step S34), generating level-n exclusion maps (step S35), generating level-n ghost maps (step S36), and optionally (not shown in FIG. 3) removing noises in the ghost maps. These steps are similar to steps S12, S13, S15 and S16 in FIG. 1 and there details will be omitted here. Then, step S31 is repeated for the next level (step S37).

If the condition is true in step S33 ("Y" in step S33), the highest level of iteration N is the level before the current level, i.e., N=n−1 (step S38). Then, for each image, the level-one to level-N ghost maps are combined to generate a combined ghost map (step S39), which are used to generate the HDR image (step S40). Steps S39 and S40 are similar to steps S19 and S21 in FIG. 1 and their details will be omitted here.

Figure 4A:
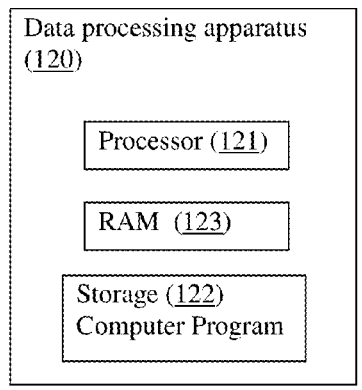
FIGS. 4A and 4B schematically illustrate a data processing apparatus and a camera, respectively, in which embodiments of the present invention may be implemented.

The ghost artifact removal methods described here can be implemented in a data processing system such as a computer 120 as shown in FIG. 4A. The computer 120 comprises a processor 121, a storage device (e.g. hard disk drive) 122, and an internal memory (e.g. a RAM) 123. The storage device 122 stores software programs, which are read out to the RAM 123 and executed by the processor 121 to carry out the methods.

Figure 4B:
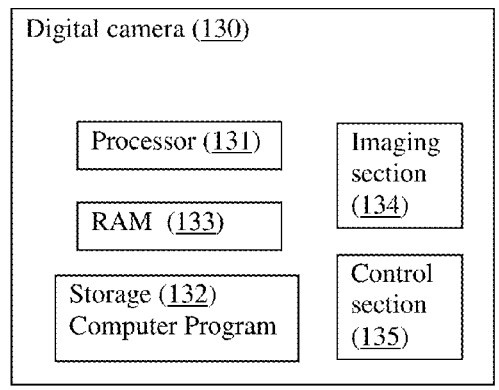

The method may also be implemented in hardwired circuits, such as one or more chips within a digital camera. FIG. 4B schematically illustrates a digital camera 130, which includes a processor 121, a storage device 132, and an internal memory 133, as well as an imaging section 134 for obtaining images and a control section 135 for controlling the various functions of the camera. The control section 135 may perform autobracketing to automatically take a set of images at different exposure levels. Autobracketing is generally known in the art and its details are omitted here. The processor 131 may process the set of images using the algorithm described above to generate an HDR image.

It will be apparent to those skilled in the art that various modification and variations can be made in the ghost artifact detection and removal method and related apparatus of the present invention without departing from the spirit or scope of the invention. Thus, it is intended that the present invention cover modifications and variations that come within the scope of the appended claims and their equivalents.

What is claimed is:

1. A method for generating a high dynamic range (HDR) image from a set of M images at different exposure levels, implemented in one or more processors, comprising:
    (a) for each image m of the set of M images, where m=1, 2, . . . M, the one or more processors generating N level-n median threshold bitmap (MTB) for n=1, 2, . . . N, where N denotes a highest level, each level-n MTB being a gray-scale image having the same size as the image m and $2^n$ gray levels, generated from the image m by mapping the pixel value of each image pixel of the image m to one of the $2^n$ gray levels, wherein the pixel value mapping maps pixel values falling within each of $2^n$ non-overlapping ranges to a gray level, wherein the $2^n$ ranges collectively span a total pixel value range of the image m, and wherein an approximately equal number of pixels of the image m is mapped to each gray level;
    (b) for each level n, the one or more processors comparing the M level-n MTBs corresponding to the M images to generate a level-n ghost map for each image m, each level-n ghost map being a binary map having a size equal to the size of the corresponding image m and having pixel values indicating whether the corresponding pixels of the corresponding image are ghost or not;
    (c) for each image m, the one or more processors combining the N level-n ghost maps using pixel-wise OR to generate a combined ghost map, where the combined ghost map has pixel values indicating whether the corresponding pixels of the image m are ghost or not; and
    (d) the one or more processors generating the HDR image using the set of M images and the corresponding combined ghost maps.

2. The method of claim 1, wherein step (a) includes, for each image m, and for level-1,
    (a1) calculating a level-1 median threshold value that divides the total pixel value range of the image m into two level-1 pixel value ranges, wherein an approximately equal number of pixels of the image m falls in each of the two level-1 pixel value ranges; and
    (a2) assigning each image pixel a gray level according to which level-1 pixel value range its pixel value falls into to generate the level-1 MTB.

3. The method of claim 2, wherein step (a) includes, for each image m, and for each level-n above level-1,
    (a3) calculating $2^{n-1}$ level-n median threshold value that divide each level-(n−1) pixel value range into two level-n pixel value ranges, wherein an approximately equal number of pixels of the image m falls in each of the two level-n pixel value ranges; and
    (a4) assigning each image pixel a gray level according to which level-n pixel value range its pixel value falls into to generate the level-n MTB.

4. The method of claim 1, further comprising, before step (b),
    (e) for each image m and each level n, the one or more processors generating an exclusion map, the exclusion map being a binary map having a size equal to the size of the image m and having pixel values indicating whether the corresponding pixels of the image m are excluded or not; and
    wherein step (b) further includes: for each pixel in the exclusion map having a pixel value indicating that the pixel is excluded, assigning a corresponding pixel of the ghost map a pixel value indicating that the pixel is not a ghost.

5. The method of claim 1, further comprising, after step (b):
(f) the one or more processors removing isolated noises in each level-n ghost map for each image m.

6. A computer program product comprising a computer usable non-transitory medium having a computer readable program code embedded therein for controlling a data processing apparatus, the computer readable program code configured to cause the data processing apparatus to execute a process for generating a high dynamic range (HDR) image from a set of M images at different exposure levels, the process comprising:
(a) for each image m of the set of M images, where m=1, 2, . . . M, generating N level-n median threshold bitmap (MTB) for n=1, 2, . . . N, where N denotes a highest level, each level-n MTB being a gray-scale image having the same size as the image m and $2^n$ gray levels, generated from the image m by mapping the pixel value of each image pixel of the image m to one of the $2^n$ gray levels, wherein the pixel value mapping maps pixel values falling within each of $2^n$ non-overlapping ranges to a gray level, wherein the $2^n$ ranges collectively span a total pixel value range of the image m, and wherein an approximately equal number of pixels of the image m is mapped to each gray level;
(b) for each level n, comparing the M level-n MTBs corresponding to the M images to generate a level-n ghost map for each image m, each level-n ghost map being a binary map having a size equal to the size of the corresponding image m and having pixel values indicating whether the corresponding pixels of the corresponding image are ghost or not;
(c) for each image m, combining the N level-n ghost maps using pixel-wise OR to generate a combined ghost map, where the combined ghost map has pixel values indicating whether the corresponding pixels of the image m are ghost or not; and
(d) generating the HDR image using the set of M images and the corresponding combined ghost maps.

7. The computer program product of claim 6, wherein step (a) includes, for each image m, and for level-1,
(a1) calculating a level-1 median threshold value that divides the total pixel value range of the image m into two level-1 pixel value ranges, wherein an approximately equal number of pixels of the image m falls in each of the two level-1 pixel value ranges; and
(a2) assigning each image pixel a gray level according to which level-1 pixel value range its pixel value falls into to generate the level-1 MTB.

8. The computer program product of claim 7, wherein step (a) includes, for each image m, and for each level-n above level-1,
(a3) calculating $2^{n-1}$ level-n median threshold value that divide each level-(n−1) pixel value range into two level-n pixel value ranges, wherein an approximately equal number of pixels of the image m falls in each of the two level-n pixel value ranges; and
(a4) assigning each image pixel a gray level according to which level-n pixel value range its pixel value falls into to generate the level-n MTB.

9. The computer program product of claim 6, wherein the process further comprises, before step (b),
(e) for each image m and each level n, generating an exclusion map, the exclusion map being a binary map having a size equal to the size of the image m and having pixel values indicating whether the corresponding pixels of the image m are excluded or not; and
wherein step (b) further includes: for each pixel in the exclusion map having a pixel value indicating that the pixel is excluded, assigning a corresponding pixel of the ghost map a pixel value indicating that the pixel is not a ghost.

10. The computer program product of claim 6, wherein the process further comprises, after step (b):
(f) removing isolated noises in each level-n ghost map for each image m.

11. A digital camera comprising the computer usable non-transitory medium of claim 6, the digital camera further comprising:
an imaging section for obtaining images; and
a control section for controlling the imaging section to obtain the set of images having different exposure levels.

* * * * *